(12) United States Patent
Ritz et al.

(10) Patent No.: US 11,938,797 B2
(45) Date of Patent: Mar. 26, 2024

(54) ALIGNMENT BRACKET ASSEMBLY FOR SLIDABLE VEHICLE DOOR

(71) Applicant: Ford Global Technologies, LLC, Dearborn, MI (US)

(72) Inventors: Dan Ritz, Windsor (CA); Scott Nydam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 17/213,688

(22) Filed: Mar. 26, 2021

(65) Prior Publication Data

US 2022/0305888 A1 Sep. 29, 2022

(51) Int. Cl.
*B60J 5/06* (2006.01)
*E05C 9/18* (2006.01)
*E05D 15/06* (2006.01)
*E05F 5/00* (2017.01)
*E05F 7/04* (2006.01)

(52) U.S. Cl.
CPC ............. *B60J 5/06* (2013.01); *E05C 9/1858* (2013.01); *E05D 15/0678* (2013.01); *B60Y 2200/11* (2013.01); *E05F 5/003* (2013.01); *E05F 7/04* (2013.01); *E05Y 2900/531* (2013.01)

(58) Field of Classification Search
CPC ...... B60J 5/06; E05C 9/1858; E05D 15/0678; E05Y 2900/531; E05F 5/003; E05F 7/04
USPC ............ 296/155, 146.12, 146.4; 49/246, 248
See application file for complete search history.

(56) References Cited

U.S. PATENT DOCUMENTS

| | | | | |
|---|---|---|---|---|
| 4,692,960 A | * | 9/1987 | Jozefczak | ............... E05D 13/04 49/213 |
| 5,069,497 A | | 12/1991 | Clelland | |
| 5,361,540 A | * | 11/1994 | Rogers, Jr. | ............. E05D 13/04 49/213 |
| 5,791,723 A | * | 8/1998 | Bell | .......................... B60J 5/06 16/86 B |
| 5,895,089 A | * | 4/1999 | Singh | ........................ E05F 7/04 49/213 |
| 5,992,927 A | * | 11/1999 | Scroggie | ................. E05F 5/022 16/85 |
| 6,206,455 B1 | * | 3/2001 | Faubert | ...................... B60J 5/06 16/86 B |
| 7,000,977 B2 | * | 2/2006 | Anders | ................... E05D 15/58 49/248 |
| 7,658,438 B1 | | 2/2010 | Elliott et al. | |
| 7,798,557 B2 | | 9/2010 | Elliott et al. | |

(Continued)

FOREIGN PATENT DOCUMENTS

DE 102015212761 5/2016
FR 2896008 7/2007

*Primary Examiner* — Gregory A Blankenship
(74) *Attorney, Agent, or Firm* — Vichit Chea; Carlson, Gaskey & Olds, P.C.

(57) ABSTRACT

A vehicle door system includes, among other things, a vehicle body and a slidable door that is slidable back and forth relative to the vehicle body between an open position and a closed position. The system further includes an alignment bracket assembly having a door-mounted portion and a body-mounted portion. The door-mounted portion and the body-mounted portion are wedged against one another when the slidable door is in the closed position to restrict movement of the slidable door relative to the vehicle body when the slidable door is in the closed position.

20 Claims, 5 Drawing Sheets

(56) References Cited

U.S. PATENT DOCUMENTS

| | | | |
|---|---|---|---|
| 7,887,118 B2 | 2/2011 | Elliott et al. | |
| 7,896,425 B2 | 3/2011 | Elliott et al. | |
| 8,282,156 B1 * | 10/2012 | Thiele | E05F 5/003 |
| | | | 296/207 |
| 8,713,852 B2 * | 5/2014 | Choi | E05F 11/48 |
| | | | 49/218 |
| 8,870,263 B2 * | 10/2014 | Choi | B60J 5/043 |
| | | | 49/169 |
| 9,545,834 B2 * | 1/2017 | Choi | B60J 5/06 |
| 9,731,583 B2 * | 8/2017 | Maruyama | B60J 5/047 |
| 10,000,947 B2 | 6/2018 | Alarcon Hernandez | |
| 10,024,084 B2 | 7/2018 | Choi | |
| 2020/0157857 A1 * | 5/2020 | van Bebber | E05B 85/20 |

* cited by examiner

ALIGNMENT BRACKET ASSEMBLY FOR SLIDABLE VEHICLE DOOR

TECHNICAL FIELD

This disclosure relates generally to a vehicle bracket door and, more particularly, to an alignment bracket assembly that can constrain movement of a slidable door relative to a vehicle body.

BACKGROUND

Some vehicles include one or more slidable doors that can slide back and forth between an open position and a closed position. A slidable door is typically coupled to a vehicle body through one or more rail and track assemblies. One type of slidable door is a limited-support door.

SUMMARY

A vehicle door system according to an exemplary aspect of the present disclosure includes, among other things, a vehicle body and a slidable door that is slidable back and forth relative to the vehicle body between an open position and a closed position. The system further includes an alignment bracket assembly having a door-mounted portion and a body-mounted portion. The door-mounted portion and the body-mounted portion are wedged against one another when the slidable door is in the closed position to restrict movement of the slidable door relative to the vehicle body when the slidable door is in the closed position.

In another exemplary embodiment of the foregoing system, a hinge arm couples the vehicle body to the sliding door.

In another exemplary embodiment of any of the foregoing systems, a first end portion of the hinge arm is pivotably coupled to the vehicle body through at least one first pivot, and an opposite, second end portion of the hinge arm is pivotably coupled to the sliding door through an at least one second pivot.

In another exemplary embodiment of any of the foregoing systems, the first end portion is an inboard end portion and the second end portion is an outboard end portion.

In another exemplary embodiment of any of the foregoing vehicle door systems, the hinge arm is a four-bar linkage.

In another exemplary embodiment of any of the foregoing systems, the slidable door is configured to slide relative to the hinge arm as the slidable door transitions between a fully open position and the closed position.

In another exemplary embodiment of any of the foregoing systems, the slidable door includes a track that slidably receives a rail portion of the hinge arm. The rail portion slides relative to the slidable door within the track as the vehicle door slides back and forth relative to the vehicle body between the open position and the closed position.

In another exemplary embodiment of any of the foregoing systems, the door-mounted portion includes a groove and the vehicle mounted portion includes a wedge that contacts a wall of the groove when the door-mounted portion and the body-mounted portion are wedged against one another.

In another exemplary embodiment of any of the foregoing systems, the groove opens downward.

In another exemplary embodiment of any of the foregoing systems, the body-mounted portion is mounted to a slidable door sill of the vehicle body.

In another exemplary embodiment of any of the foregoing systems, the alignment bracket assembly is disposed at a vertical bottom of the slidable door.

In another exemplary embodiment of any of the foregoing systems, the vehicle body does not include a B-pillar.

In another exemplary embodiment of any of the foregoing systems, the slidable door is a rear side door for the vehicle.

In another exemplary embodiment of any of the foregoing systems, the slidable door is a limited-support door.

Another exemplary embodiment of any of the foregoing systems includes a rail that is received within a track to couple the slidable door to the vehicle body. The rail slides within the track as the vehicle door slides back and forth relative to the vehicle body between the open position and the closed position.

In another exemplary embodiment of any of the foregoing systems, the slidable door is slidably coupled to the vehicle body using no more than two rails received within respective tracks.

In another exemplary embodiment of any of the foregoing systems, the slidable door slidably coupled to the vehicle body using no more than one rail received within a track.

In another exemplary embodiment of any of the foregoing systems, the slidable door and the vehicle body are constituents of an electrified vehicle.

A vehicle door securing method according to another exemplary aspect of the present disclosure includes, among other things, wedging a door-mounted portion of an alignment bracket assembly against a body mounted portion of the alignment bracket assembly. The wedging restricting movement of a slidable door relative to a vehicle body when the slidable door is in a closed position.

Another example of the foregoing method includes sliding the slidable door from an open position to the closed position using a hinge arm, and pivoting the slidable door relative to the hinge arm during the sliding.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
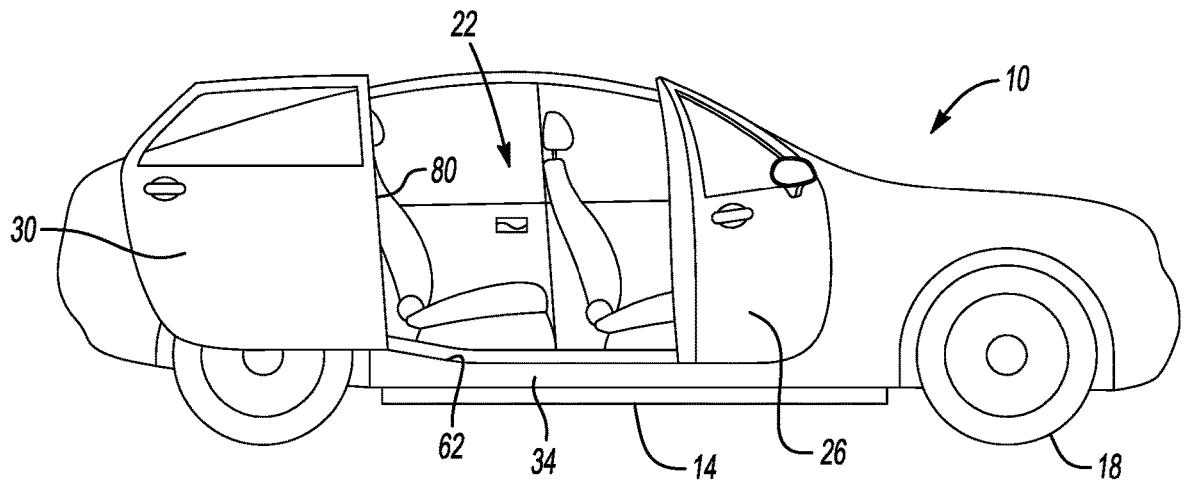
FIG. 1 shows a side view of a vehicle having a slidable door and alignment bracket assembly according to an exemplary embodiment of the present disclosure. The slidable door is in an open position.
Figure 2:
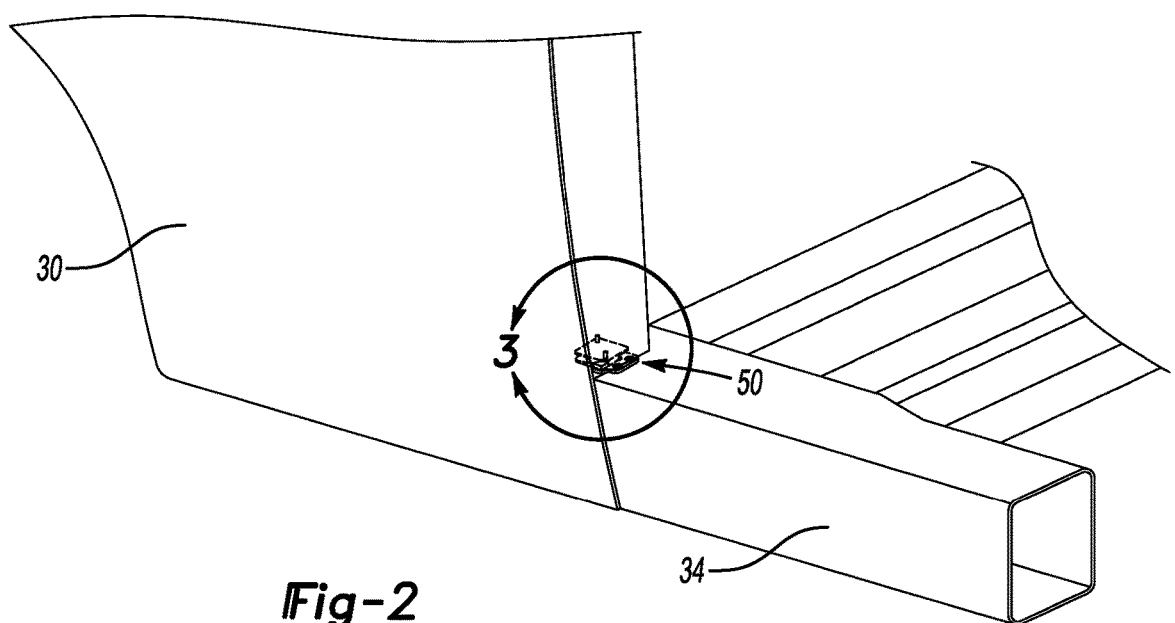
FIG. 2 illustrates a perspective view of a portion of the vehicle of FIG. 1 showing the slidable door of the vehicle in a closed position.
Figure 3:
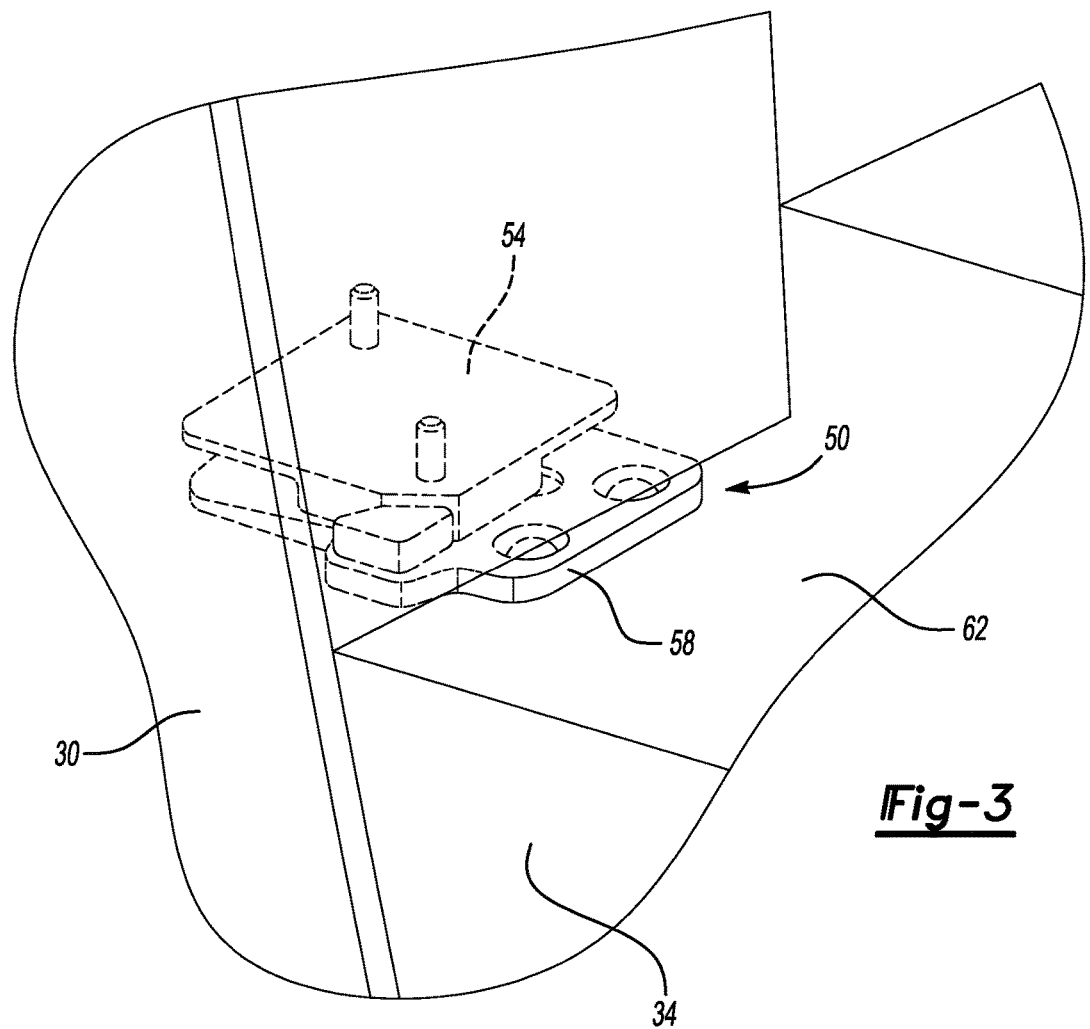
FIG. 3 illustrates a close-up view of Area 3 in FIG. 2.
Figure 4:
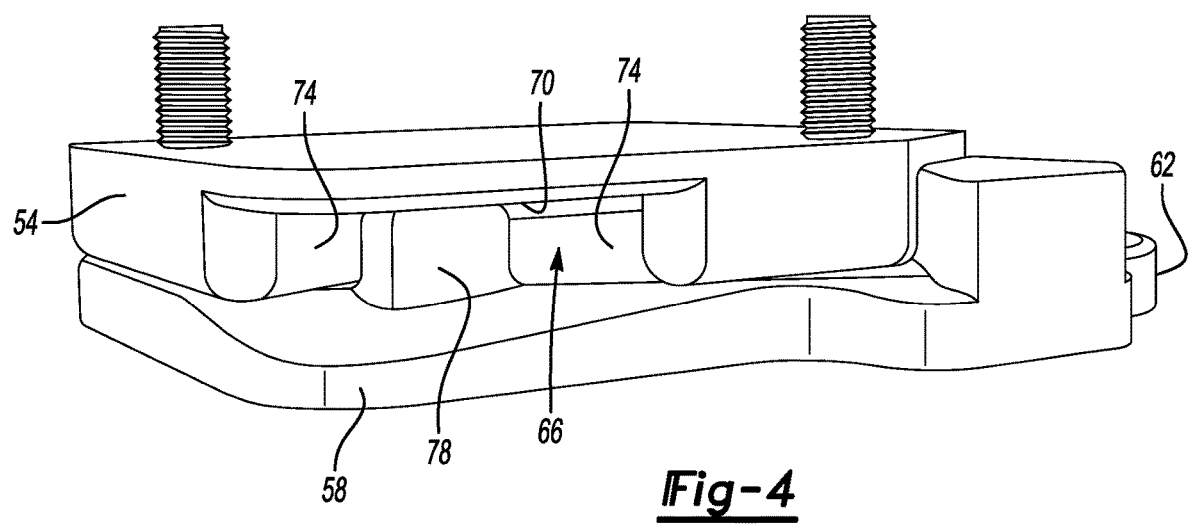
FIG. 4 shows another view of the alignment bracket assembly.

This disclosure relates generally to a bracket assembly and, more particularly, to an alignment bracket assembly that can restrict undesirable movement of a slidable door relative to a vehicle body when the slidable door is in a closed position. Restricting relative movement of the slidable door in the closed position can effectively increase torsional stiffness of the slidable door.

A type of slidable door is a limited-support slidable door. These types of doors are often used vehicles that do not include conventional B-pillars. Since limited-support doors typically omit one or more of the rail and track assemblies found in conventional slidable doors, loading the limited-support door may be more likely to induce movement of the slidable door relative to the vehicle body. The teachings of this disclosure relating to the alignment bracket assemblies are particularly useful for limited-support doors.

Limited support doors are often used in connection with electrified vehicles. Packaging the traction battery beneath the vehicle may be easier if the vehicle does not include a rail and track along a lower edge of the door.

With reference to FIGS. 1-4, a vehicle 10 is an electrified vehicle. The vehicle 10 includes a traction battery 14 that can power an electric machine that generates torque to drive wheels 18 of the vehicle 10.

The vehicle 10 includes a passenger compartment 22, a door 26, and a door 30. The door 26 is a front door that is hinged to a vehicle body 34 of the vehicle 10. The door 26 can pivot from the open position shown in FIG. 1 to a closed position. The door 26 pivots relative to the vehicle body 34 about a vertically extending axis.

The door 30, in the exemplary embodiment, is a rear door that is slidable. The door 30 is slidable back-and-forth relative to the vehicle body 34 between an open position, such as the fully open position shown in FIG. 1, and the closed position shown in FIGS. 2 and 3. The door 30 is a limited-support door and lacks a rail and track assembly that couples a lower edge of the door 30 to the vehicle body 34.

The vehicle 10 lacks a B-pillar. The vehicle 10 can be considered a B-pillarless vehicle as the vehicle 10 does not include a B-pillar. Omitting the B-pillar can provide packaging flexibility and facilitate entry and exit from the passenger compartment 22.

An alignment bracket assembly 50 is used in connection with the door 30 and the vehicle body 34. The alignment bracket assembly 50 is used to restrict movement of the door 30 relative to the vehicle body 34 when the door 30 is in the closed position of FIGS. 2 and 3. The alignment bracket assembly 50 facilitates torsional stiffness through the slidable door 30 when the slidable door 30 is in the closed position.

Generally, the alignment bracket assembly 50 includes a door-mounted portion 54 and a body-mounted portion 58. The door-mounted portion 54 is directly secured to a downwardly facing surface area of the door 30 and a vertically lower portion of the door 30. Vertical, for purposes of this disclosure, is with reference to ground and an ordinary orientation of the vehicle 10 during operation. The door-mounted portion 54 can be secured using mechanical fasteners that extend through apertures, for example. The apertures can be slots to facilitate adjusting the door-mounted portion 54 relative to the door.

The body-mounted portion 58 is mounted to a vertically upward facing surface of the vehicle body 34, which is a door sill 62 in this example. The body-mounted portion 58 can be secured using mechanical fasteners that extend through slots, for example. The fasteners that secure the body-mounted portion 58 can be exposed so the position of the door-mounted portion 54 and the body-mounted portion 58 can be adjusted with the door 30 in the closed position. This can be beneficial for setting door flushness.

When the door 30 is in the closed position, the door-mounted portion 54 and the body-mounted portion 58 are wedged against one another, which restricts movement of the door 30 relative to the vehicle body 34.

In the exemplary embodiment, the door-mounted portion 54 includes a groove 66 that opens vertically downward. The door-mounted portion 54 includes a floor 70 and a pair of sidewalls that define the groove 66.

The body-mounted portion 58 includes a wedge 78 that extends vertically upward. The wedge 78 is received within the groove 66 when the slidable door 30 is in the closed position. As the door 30 is moved to the closed position, the wedge 78 is moved into direct contact with one of the walls 74. The contact between the wedge 78 and the wall 74 wedges the door-mounted portion 54 against the body-mounted portion 58 to restrict movement of the slidable door 30 relative to the vehicle body.

Figure 5A:
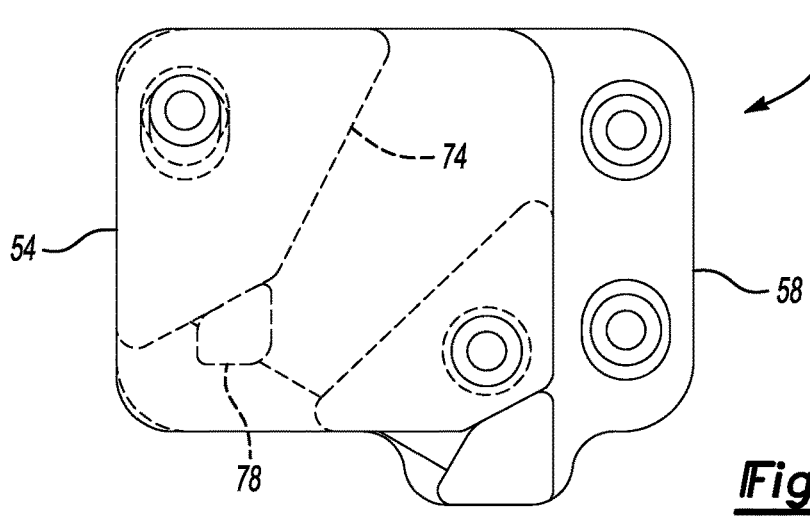
FIG. 5A illustrates a top view of the alignment bracket assembly of FIG. 4 when the slidable door is a closed position.

With reference now to the top view of FIG. 5A, with the wedge 78 can be biased slightly against the wall 74 when restricting movement of the slidable door 30 relative to the vehicle body 34. Moving the slidable door 30 from the closed position to a first open position shown in FIG. 5B, moves the wall 74 away from the wedge 78 on the body-mounted portion 58. Moving the slidable door 30 from the first open position of FIG. 5B to the second open position of FIG. 5C moves the door-mounted portion 54 further from the wedge 78. When moving from the closed position of FIG. 5A to the first open position FIG. 5B, the slidable door 30 moves slightly outboard and rearward relative to the vehicle body 34.

The groove 66 tapers outward toward a centerline of the vehicle body 34, which can help guide the wedge 78 within the groove 66 as the slidable door 30 is moved from the fully open position back to the closed position of FIG. 5A. The slidable door 30 is connected to the vehicle body 34 utilizing any track and rail structure along a lower edge of the slidable door 30.

Figure 5B:
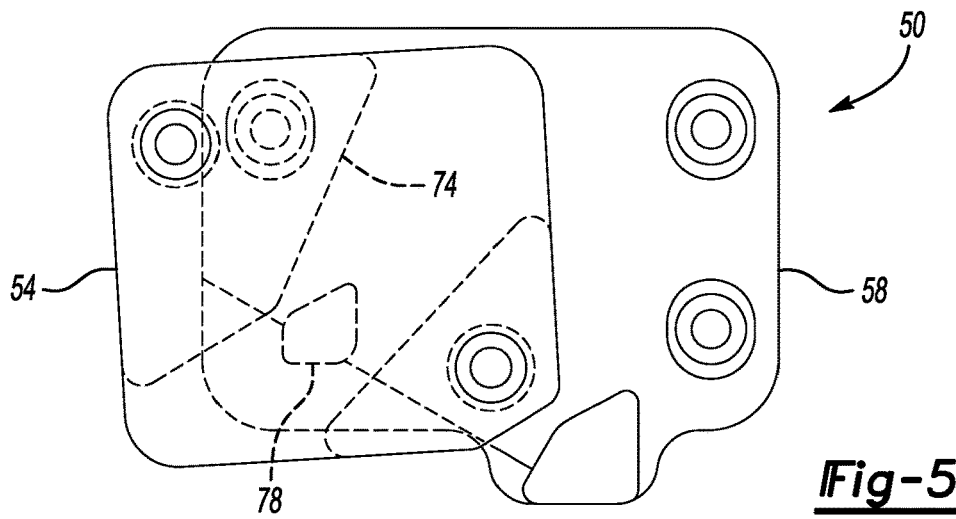
FIG. 5B illustrates a view of FIG. 5A after the slidable door has been moved from the closed position of FIG. 5A to a first open position.
Figure 5C:
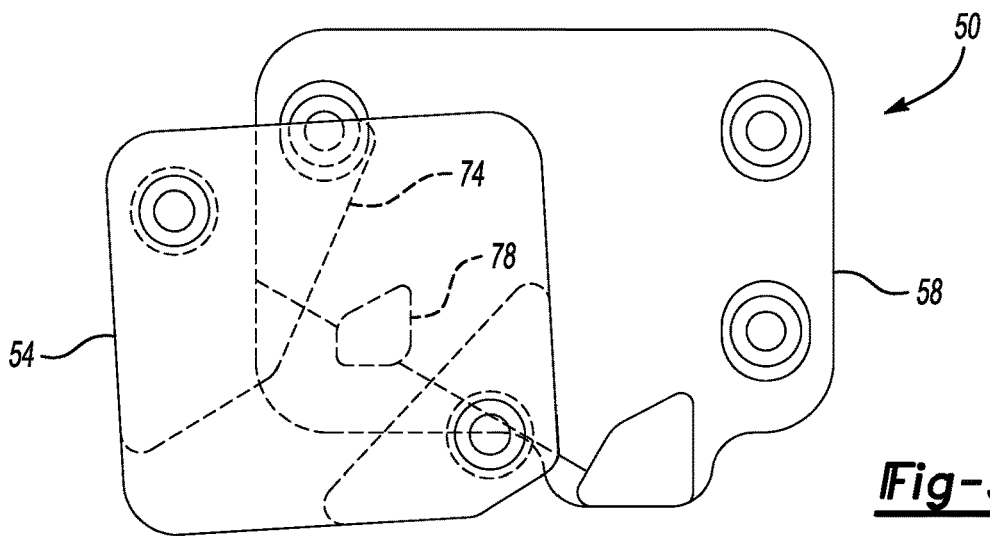
FIG. 5C illustrates the alignment bracket assembly of FIG. 5A after the slidable door has been moved to a second open position where the slidable door is more open than the first open position of FIG. 5B.
Figure 6A:
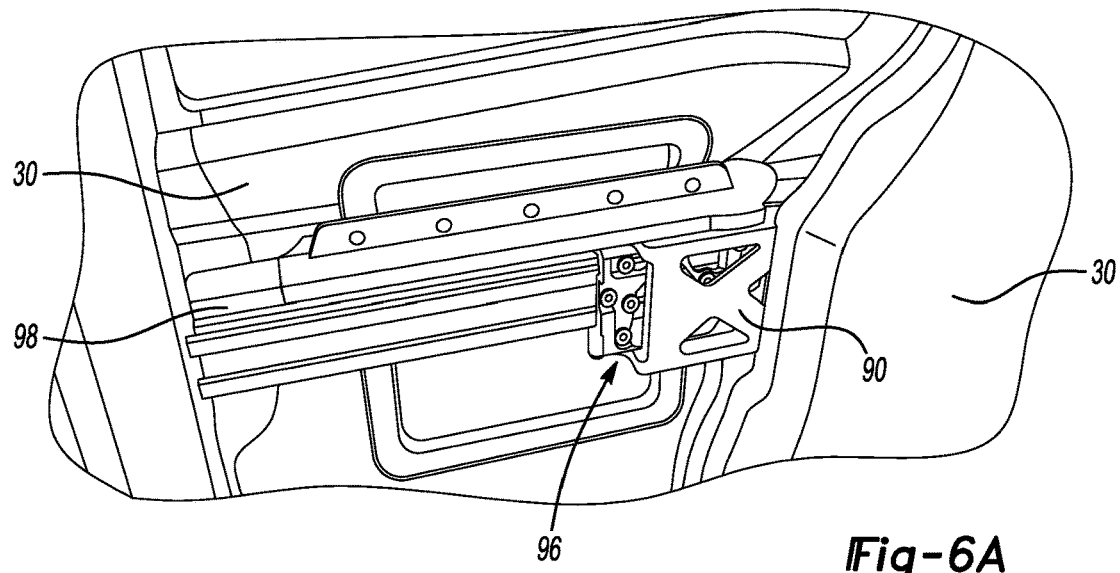
FIG. 6A illustrates a close-up view of a portion of the slidable door and the vehicle body from inside a passenger compartment of the vehicle when the slidable door is in the closed position of FIG. 5A.
Figure 6B:
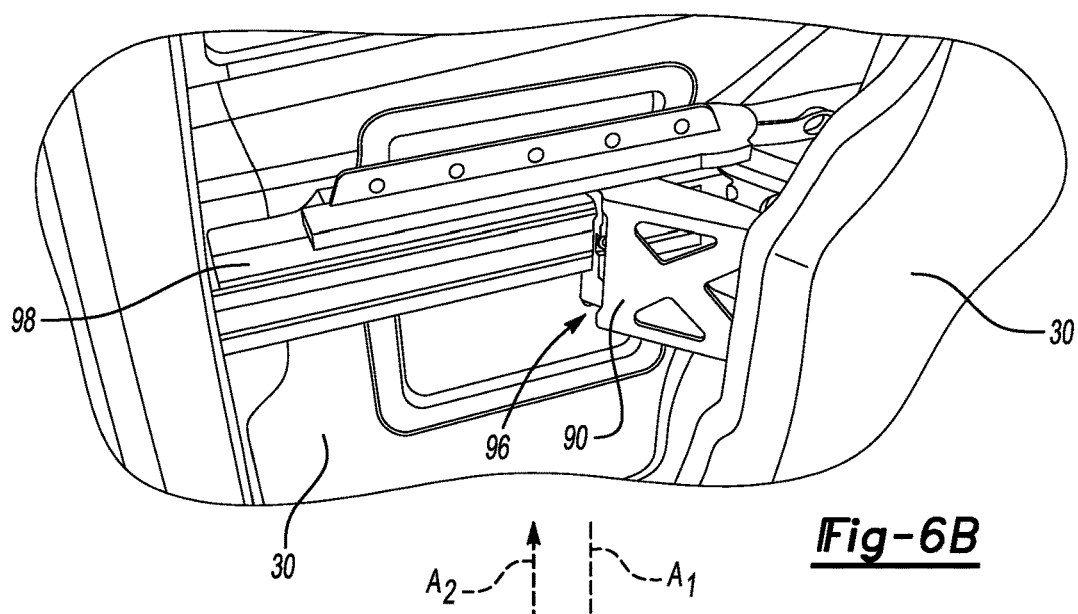
FIG. 6B illustrates the portion of the slidable door and the vehicle body in FIG. 6A when the slidable door is in the first open position of FIG. 5B.
Figure 6C:
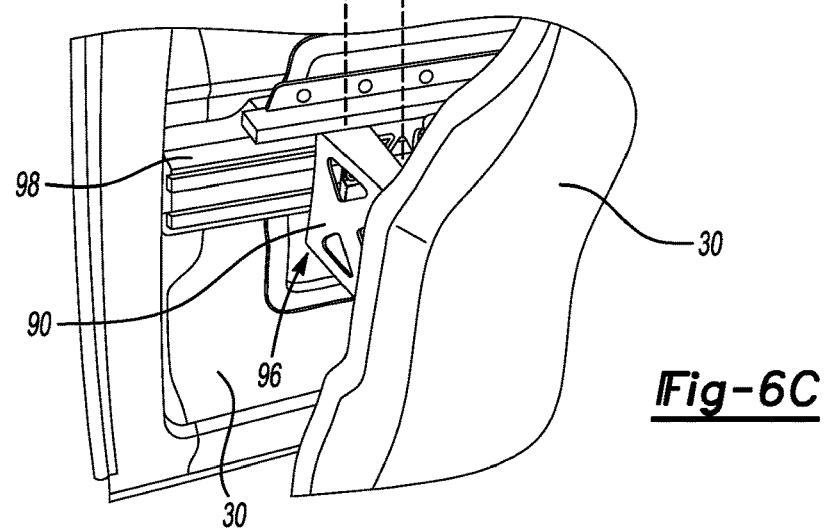
FIG. 6C illustrates the portion of the slidable door and the vehicle body of FIG. 6A when the slidable door is in the second open position of FIG. 5C.

FIG. 6A-6C shown the slidable door 30 at the position corresponding to FIGS. 5A-5C. A hinge arm 90 couples the slidable door 30 to the vehicle body 34. An inboard end portion of the hinge arm 90 is pivotably coupled to the vehicle body 34 such that the hinge arm 90 can pivot back and forth about an axis $A_1$ between the positions of FIGS. 6A and 6C. An outboard end portion 96 of the hinge arm 90 is pivotably coupled to the slidable door 30 such that the hinge arm 90 can pivot relative to the slidable door 30 about a second axis $A_2$.

The outboard end portion 96 is also slidable within a track assembly 98 relative to the slidable door 30. The track assembly 98 is directly mounted to the slidable door 30. As the slidable door 30 moves from the position of FIG. 6A to the position of FIG. 6B, the inboard end portion of the hinge arm 90 pivots about the axis $A_1$ relative to the vehicle body 34, and the outboard end portion of the hinge arm 90 pivots about the axis $A_2$ relative to the slidable door 30.

As the slidable door 30 moves from the position of FIG. 6B to the position of FIG. 6C, the inboard end portion of the hinge arm 90 can continue to pivot about the axis $A_1$ relative to the vehicle body 34, and the outboard end portion of the hinge arm 90 pivots about the axis $A_2$ relative to the slidable door 30. The slidable door 30, when moving from the position of FIG. 6B to the position of FIG. 6C also slides rearward relative to the outboard end portion 96 of the hinge arm 90.

In an exemplary embodiment, the hinge arm 90 is considered a four-bar linkage. The slidable door 30 can be supported entirely by the hinge arm 90 and can be coupled to the vehicle body 34 exclusively through the hinge arm 90. No additional track and rail structure is required at a vertical bottom of the slidable door 30 or a vertical top of the slidable door 30.

With reference again to FIGS. 1-3, the alignment bracket assembly 50 of the exemplary embodiment is at a vertical bottom of the door 30 between the door sill 62 and a downwardly facing surface of the door 30. The alignment bracket assembly 50 of the exemplary embodiment is configured to bias the slidable door 30 outboard. The wedge 78 is configured to contact the wall 74 through substantially a single surface. The single surface can resist forward and outboard movement of the door 30 relative to the vehicle body 34.

In other examples, the alignment bracket assembly 50 could be used a latch replacement on a front side 80 of the slidable door 30. When used as a latch replacement, the alignment bracket assembly 50 engagement can be controlled by a position of the door 30 in contrast to a typical door latch that is manually controlled to release. In other examples, the alignment bracket assembly 50 could be adapted to instead or additionally control relative forward and aft movement.

Figure 7:
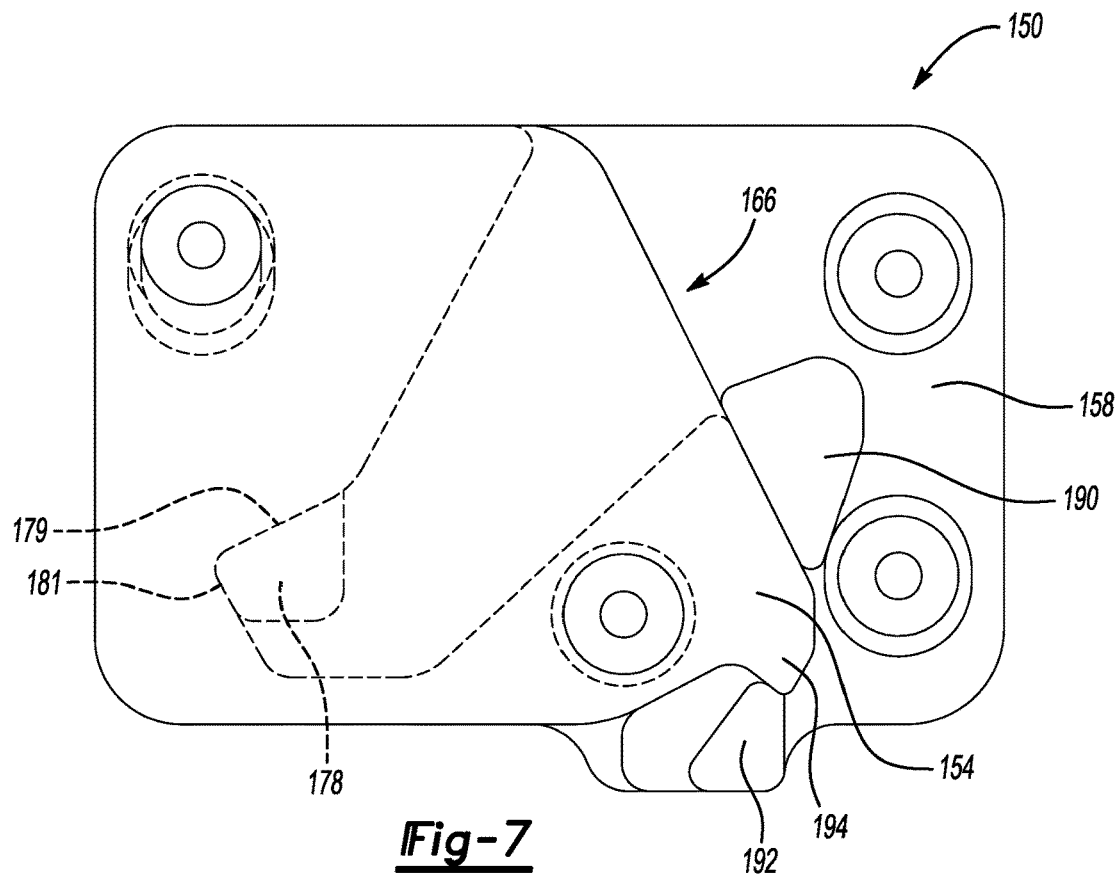
FIG. 7 illustrates an alignment bracket assembly according to yet another exemplary aspect of the present disclosure.

FIG. 7 illustrates an alignment bracket assembly 150 according to another exemplary aspect of the present disclosure. The alignment bracket assembly 150 can be used in connection with the door 30 and the vehicle body 34 of the vehicle 10 in FIG. 1.

The alignment bracket assembly 150 includes a door-mounted portion 154 and a body-mounted portion 158. The door-mounted portion 154 includes walls defining a groove 166 that opens vertically downward.

The body-mounted portion 158 includes a wedge 178 that extends vertically upward. As the door 30 is moved to the closed position, a first side 179 of the wedge 178 is moved into direct contact with a portion of a wall of the door-mounted portion 154. Also, as the door 30 is moved to the closed position, a second side 181 of the wedge 178 is moved into direct contact with a portion of the wall of the body-mounted portion 154. The first side 179 is oriented along a plane that is transverse to the second side 181.

Directly contacting both the first side 179 and the second side 181 against the wall of the door-mounted portion 154 helps to restrict inboard and outboard movement of the door 30 relative to the vehicle body 34, and additionally fore and aft movement of the door 30 relative to the vehicle body 34. The alignment bracket assembly 150, due to the additional reaction surfaces, can potentially constrain relative movement in more directions than the alignment bracket assembly 150.

The body-mounted portion 158 additionally includes a first extension 190 that extends vertically upward and a second extension 192 that extends vertically upward. A hooked area 194 of the door-mounted bracket 154 is held between the first extension 190 and the second extension 192 when the door 30 is closed. Holding the hooked area 194 between the first extension 190 and the second extension 192 helps further limit relative movement between the door 30 and the vehicle body 34. In particular, the first extension 190 can help to restrict relative forward and relative inboard movement of the door 30, and the second extension 192 can help to restrict relative outboard and rearward movement.

Figure 8:
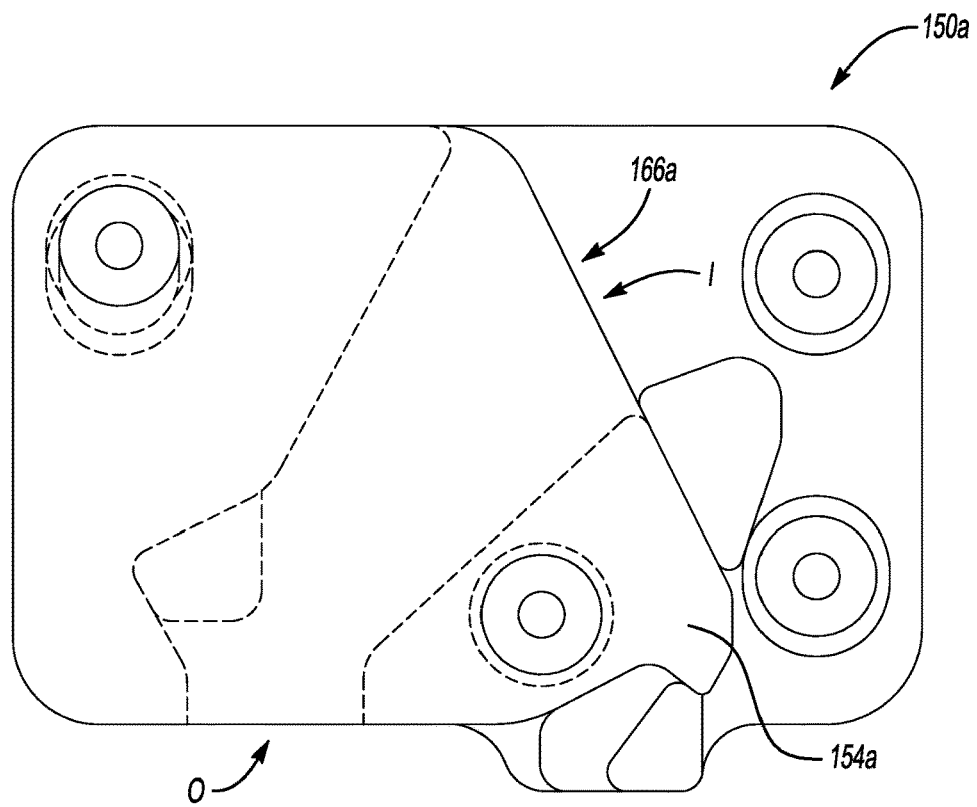
FIG. 8 illustrates an alignment bracket assembly according to still another exemplary aspect of the present disclosure.

Referring to FIG. 8, the alignment bracket 150A is a variation of the bracket 150 of FIG. 7. In the FIG. 8 embodiment, the gap 166A opens to an outboard side O and an inboard side I of the door-mounted portion 154A. the added feature of opening the gap 166A to the outboard side can help facilitate cleaning.

Features of the disclosed examples include an alignment bracket assembly having portions that wedge against one another to help to restrict movement of a slidable vehicle door relative to a vehicle body. The alignment bracket can be used in vehicles that do not include a B-pillar. That is, generally, a slidable door that is a limited-support door.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle door system, comprising:
   a vehicle body;
   a slidable door that is slidable back-and-forth relative to the vehicle body between an open position and a closed position; and
   an alignment bracket assembly having a door-mounted portion and a body-mounted portion, the door-mounted portion and the body-mounted portion wedged against one another when the slidable door is in the closed position to restrict movement of the slidable door relative to the vehicle body when the slidable door is in the closed position, wherein the body-mounted portion is mounted to a slidable door sill of the vehicle body.

2. The vehicle door system of claim 1, a hinge arm coupling the vehicle body to the sliding door.

3. The vehicle door system of claim 2, wherein a first end portion of the hinge arm is pivotably coupled to the vehicle body through at least one first pivot, wherein an opposite, second end portion of the hinge arm is pivotably coupled to the sliding door through at least one second pivot.

4. The vehicle door system of claim 3, wherein the first end portion is an inboard end portion and the second end portion is an outboard end portion.

5. The vehicle door system of claim 2, wherein the hinge arm is a four-bar linkage.

6. The vehicle door system of claim 2, wherein the slidable door is configured to slide relative to the hinge arm as the slidable door transitions between a fully open position and the closed position.

7. The vehicle door system of claim 2, wherein the slidable door includes a track that slidably receives a rail portion of the hinge arm, the rail portion sliding relative to the slidable door within the track as the vehicle door slides back-and-forth relative to the vehicle body between the open position and the closed position.

8. The vehicle door system of claim 1, wherein the door-mounted portion includes a groove, and the body-mounted portion includes a wedge that contacts a wall of the groove when the door-mounted portion and the body-mounted portion are wedged against one another, wherein the wedge projects vertically upward away from the slidable door sill.

9. The vehicle door system of claim 8, wherein the groove opens downward, wherein the door-mounted portion includes a floor and a pair of sidewalls that project vertically downward away from the floor to define the groove that opens downward.

10. The vehicle door system of claim 1, wherein the alignment bracket assembly is disposed at a vertical bottom of the slidable door and is secured directly to a downwardly facing surface of the slidable door.

11. The vehicle door system of claim 1, wherein the vehicle body does not include a B-pillar.

12. The vehicle door system of claim 1, wherein the slidable door is a rear side door of the vehicle.

13. The vehicle door system of claim 1, wherein the slidable door is a limited-support door.

14. The vehicle door system of claim 1, further comprising a rail and that is received within a track to couple the slidable door to the vehicle body, the rail sliding within the track as the vehicle door slides back-and-forth relative to the vehicle body between the open position and the closed position.

15. The vehicle door system of claim 1, wherein the slidable door is slidably coupled to the vehicle body using no more than two rails received within respective tracks.

16. The vehicle door system of claim 1, wherein the slidable door is slidably coupled to the vehicle body using no more than one rail received within a track.

17. The vehicle door system of claim 1, wherein the slidable door and the vehicle body are constituents of an electrified vehicle.

18. The vehicle door system of claim 1, wherein the alignment bracket assembly is disposed vertically between the slidable door and the slidable door sill when the slidable door is in the closed position.

19. A vehicle door securing method, comprising:
wedging a door-mounted portion of an alignment bracket assembly against a body-mounted portion of the alignment bracket assembly, the wedging restricting movement of a slidable door relative to a vehicle body when the slidable door is in a closed position, the body-mounted portion mounted to a door sill.

20. The vehicle door securing method of claim 19, further comprising sliding the slidable door from an open position to the closed position using a hinge arm, and pivoting the slidable door relative to the hinge arm during the sliding.

* * * * *